US005829304A

United States Patent [19]

Woltering

[11] Patent Number: 5,829,304

[45] Date of Patent: Nov. 3, 1998

[54] SIMPLE INEXPENSIVE VIBRATOR

[76] Inventor: Howard M. Woltering, Rte. 2 Box 454, Foster, Ky. 41043

[21] Appl. No.: 659,082

[22] Filed: Jun. 3, 1996

[51] Int. Cl.[6] .......... F16H 33/20

[52] U.S. Cl. .......... 74/87; 74/61; 366/128

[58] Field of Search .......... 74/61, 87; 366/128

[56] References Cited

U.S. PATENT DOCUMENTS

| | | | |
|---|---|---|---|
| 1,192,501 | 7/1916 | Combs . | |
| 3,505,886 | 4/1970 | Hill et al. | 74/61 |
| 3,810,394 | 5/1974 | Novak | 74/87 |
| 4,142,451 | 3/1979 | Burns | 91/491 |
| 4,241,615 | 12/1980 | Ryan | 74/61 |
| 4,617,832 | 10/1986 | Musschoot | 74/87 |
| 4,991,453 | 2/1991 | Mason | 74/61 X |
| 5,054,331 | 10/1991 | Rodgers | 74/84 R |
| 5,146,798 | 9/1992 | Anderson | 74/78 |

FOREIGN PATENT DOCUMENTS

| | | | |
|---|---|---|---|
| 2288882 | 6/1976 | France | 74/84 S |
| 63188 | 9/1912 | Switzerland | 74/84 S |

*Primary Examiner*—Allan D. Herrmann
*Attorney, Agent, or Firm*—William S. Ramsey

[57] ABSTRACT

This invention provides a simple and inexpensive vibrator. Upper and lower linked arms are used to hold equal weights attached at the ends of the arms. The arms are attached to collars which spin. A bent axle is used to cause displacement of the upper collar with a resultant shortening of the effective radius of rotation of one of the weights at a determined position in the circle of rotation. This shortening of the effective radius of rotation imparts a vibratory motion to the vibrator.

10 Claims, 3 Drawing Sheets

SIMPLE INEXPENSIVE VIBRATOR

BACKGROUND OF THE INVENTION

1. Field of the Invention

This invention relates to vibrating devices and more particularly to vibrating devices for plows.

2. Description of Related Art

U.S. Pat. No. 1,190,501 discloses a gyratory structure in which a crank shaft imparts a rotary motion to sieve boxes.

U.S. Pat. No. 4,142,451 discloses a vibrator with pistons which move toward and away from the axis. Movement of the pistons is controlled by approach ramp surfaces.

U.S. Pat. No. 4,241,615 discloses a vibrating device in which weights at the end of a rotating arm are effectively moved in and out with respect to the axis by the rotation of unbalanced masses.

U.S. Pat. No. 4,617,832 discloses a vibratory apparatus having a movable weight which is moved by fluid pressure against a spring.

U.S. Pat. No. 5,054,331 discloses a gyroscopic propulsion apparatus in which sliding rods which bear weights are used to vary the radius of rotation of the weights. The positions of the weights with respect to the radius are controlled by a cable and pulley.

U.S. Pat. No. 5,146,798 discloses a transmission apparatus using wedge hinge assemblies which cause a weight to move toward and away from the axis of rotation.

The prior art disclosures do not meet the needs which are met by the present invention, the need for a simple, inexpensive, reliable vibratory device.

SUMMARY OF THE INVENTION

The vibrator of this invention is based on the fact that vibration results from the rotation of weights of equal mass located at the ends of rotating arms if the effective radius of the arms is different.

In this vibrator, a rotating radius variation subassembly is rotated. In this subassembly the effective radius of each weight located at the end of a rotating arm is varied mechanically during the rotation of each weight through a full circle. Each weight is attached to arms located on each of two collars. The upper collar is given an eccentric motion with respect to the lower collar due to the rotation of the upper collar about a bent axle. Variation in the effective radius of the weights is caused by the effect of the eccentric motion of the upper collar.

The location of the upper collar on the axle may be varied using a ring and setscrew attached to the axle. The eccentricity of movement of the upper collar is increased, along with the variation in effective radius of the weights, and the resulting vibration, when the ring is used to secure the upper collar relatively far from the lower collar.

A motor or other source of rotary motion is used to rotate the radius variation subassembly.

An objective of this invention is a vibrator having unbalanced weights wherein the amount of unbalance may be varied.

Another objective is a vibrator in which the weights are rendered unbalanced by differences in the effective radius of their rotation.

Another objective is a vibrator in which the effective radius of the weights varies continuously during the rotation of the vibrator.

A final objective is a vibrator which is simple, inexpensive, reliable, and long lasting.

DESCRIPTION OF THE PREFERRED EMBODIMENTS

Figure 1:
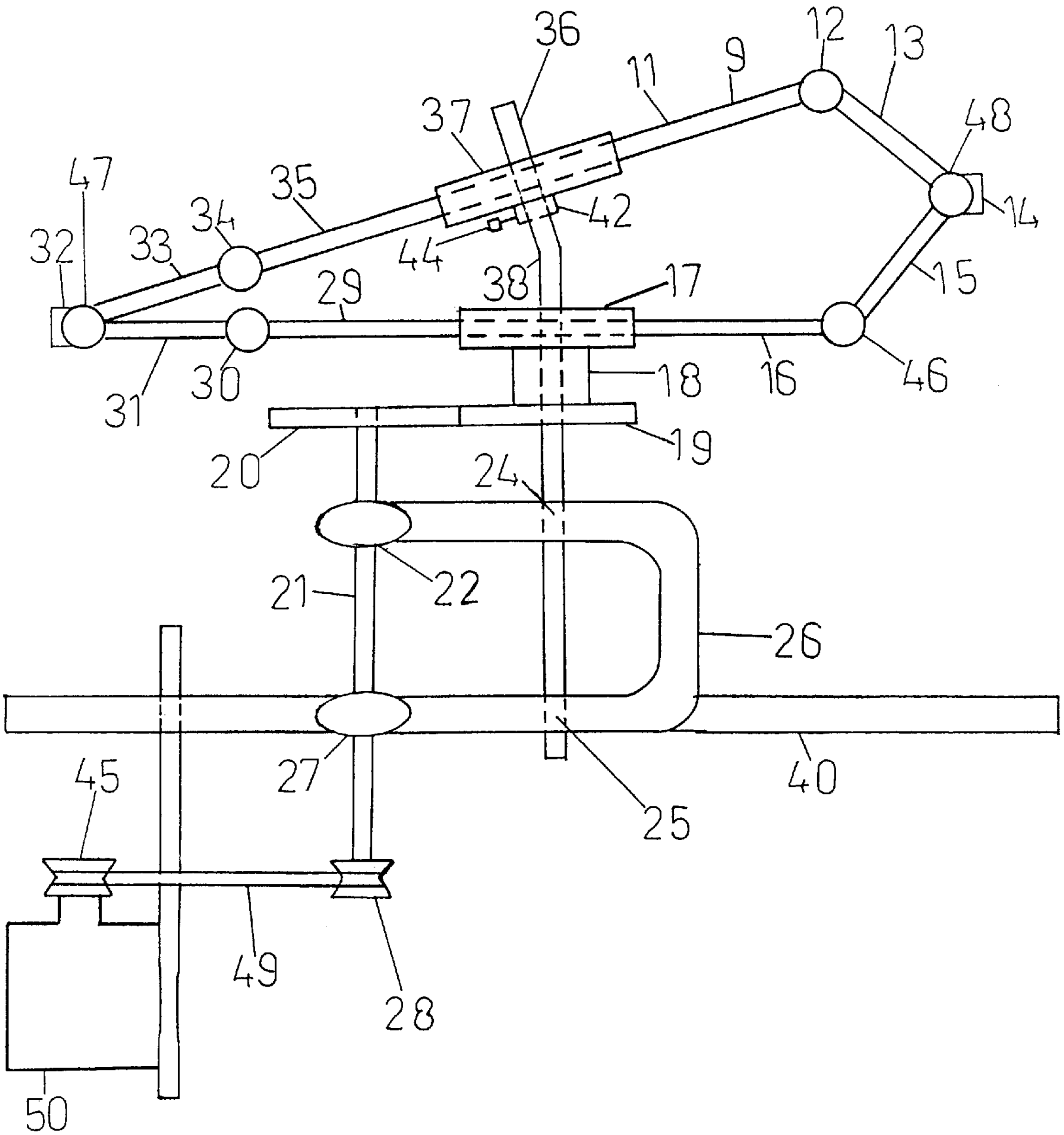
FIG. 1 is a diagrammatic representation of the vibrator in side view.

FIG. 1 is a diagram of the side view of the vibrator 10. A base 40 supports the vibrator 8. A C-shaped support member 26 is rigidly attached to the base 40. Holes 24 and 25 are located in support member 26. A nonrotating axle 36 is inserted into holes 24 and 25 in the support member 26 and the axle is welded to the support member at holes 24 and 25. The axle 36 has a bend 38, which is exaggerated for clarity in FIG. 1. The intensity of vibration imparted by the vibrator is in part due to the size of the bend 38, which may be from 0.01° to 45°. A preferred range is 1° to 45°.

A freely rotating lower collar 17 is axially located on the axle 36 between the bend 38 and the weld 24. Lower arms 16 and 29 are radially attached at a first end to lower collar 17 along a single diameter to collar 17. Lower arms 16 and 29 are equal in length. Hinge 30 is attached at a second end to arm 29, and hinge 46 is attached at a second end to arm 16. Connecting link 31 is attached at a first end to hinge 30, and connecting link 15 is attached at a first end to hinge 46. Connecting link 31 is equal in length to connecting link 15.

A freely rotating upper collar 37 is axially located on the axle 36 on the other side of the bend 38. Upper arms 11 and 35 are radially attached at a first end to upper collar 37 along a single diameter to collar 37. Upper arms 11 and 35 are equal in length and are equal in length to lower arms 16 and 29. Hinge 34 is attached at a second end of arm 35, and hinge 12 is attached at a second end of arm 11. Connecting link 33 is attached at a first end to hinge 34, and connecting link 13 is attached at a first end to hinge 12. Connecting link 33 is equal in length to connecting link 13 and both are equal in length to connecting links 31 and 15.

Connecting links 31 and 33 are connected at a second end to weight hinge 47 and connecting links 13 and 15 are connected at a second end to weight hinge 48.

Weight 32 is attached to weight hinge 47 and weight 14 is connected to weight hinge 48. The mass of weight 32 is equal to the mass of weight 14.

The subassembly 11 consisting of lower and upper collars, arms, connecting links, hinges, and weights is termed the radius variation subassembly 9.

Rotation of lower collar 17 causes rotation of the entire radius variation subassembly 9.

The location of upper collar 37 along the length of axle 36 may be fixed by ring 42 axially located on axle 36 and is secured by setscrew 44. By varying the location of ring 42, the location of upper collar 37 on axle 36 is varied.

Rotating spacer 18 is axially located on axle 36 and is firmly attached to the underside of collar 17. Rotating gear 19 is axially located on axle 36 and is firmly attached to the underside of spacer 18. Gear 19 meshes with gear 20. Gear 20 is attached at one end to second axle 21. Second axle 21 is supported by journal bearings 22 and 27. Bearings 22 and 27 are attached to the arms of C-shaped support member 26. Pulley 28 is attached to second axle 21. Pulley 28 is driven by electric motor 50 via pulley 45 on the motor and v-belt 49.

In operation, motor 50 causes gear 20 to rotate, which causes gear 19, spacer 18, and lower collar 17 to rotate. Rotation of lower collar 17 causes the entire radius variation subassembly to rotate. Since axle 36 is bent at 38, the center of rotation of upper collar 37 is displaced from the center of rotation of lower collar 17. The displacement of upper collar 37 from lower collar 17 varies with the location of the radius variation subassembly in a complete circle. The displacement of upper collar 37 from lower collar 17 affects the distance between hinge 34 located on upper arm 35 and hinge 30, located on lower arm 29. Similarly, this displacement affects the distance between hinge 12 located on upper arm 11 and hinge 46 located on lower arm 16. The distance of weights 32 and 14 from axle 36 at lower collar 17 is termed the effective radius of rotation of each weight. In FIG. 1, the effective radius of rotation of weight 32 is greater than the effective radius of rotation of weight 14. Rotation of the radius variation subassembly causes the vibration of the vibrator.

The degree of displacement of upper collar 37 with respect to lower collar 17 may be varied by the location of upper collar 37 on axle 36. The variation will be greater the farther away upper collar 37 is from lower collar 17. The greater the distance of upper collar 37 is from lower collar 17, the greater is the variation in effective radius of rotation of the weights, and the greater the vibration of the vibrator. Ring 42, secured by setscrew 44, is used to fix upper collar 37 at a desired location on axle 36.

FIGS. 2, 3, 4, and 5 diagrammatically depict the displacement of upper collar 37 from lower collar 17 and the effective radius of rotation of weights 14 and 32 during one complete rotation of radius variation subassembly 9. For the purposes of FIGS. 2–5, it will be assumed that the length of lower arms 16 and 29 equals 20 inches and that the length of connector links 31 and 15 equals 10 inches. These numbers are used only as an example. The invention may have arms and connector links of other lengths, and may have other ratios between the lengths of the arms and connector links. The orientation of the arms through a complete rotation is indicated by the circle 52 with marks indicating 0, 90, 180, and 270 degrees.

Figure 2:
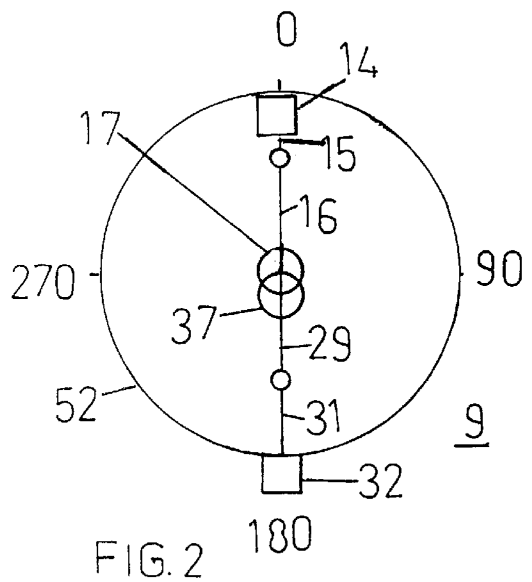
FIGS. 2, 3, 4, and 5 are diagrams showing the effective radius of the weights during the rotation of the radius variation subassembly through a complete circle.

FIG. 2 shows the radius variation subassembly 9 with weight 14 at 0 degrees and weight 32 at 180 degrees. Because of the displacement of collar 37 relative to collar 17 the effective radius of rotation of weight 14 is at its minimum and is the length of arm 16 plus approximately one half of the length of connector link 15, or 20 inches plus 5 inches or 25 inches. Similarly, because of the displacement of collar 37 relative to collar 17 the effective radius of rotation of weight 32 is the length of arm 29 plus approximately the length of connector link 31, or 20 inches plus 10 inches or 30 inches.

Figure 3:
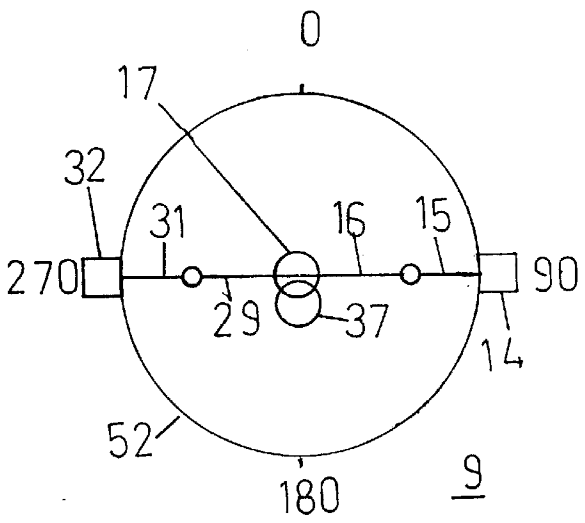

FIG. 3 shows subassembly 9 with weight 14 at 90 degrees and weight 32 at 270 degrees. In this position, the effective radius of rotation of both weights 14 and 32 are the same, and the effect of the displacement of collar 37 from collar 17 is the same for each weight and is intermediate between the effect when a weight is at 0 or at 180 degrees. The effective radius of rotation of weights 14 and 32 is 20 inches plus approximately 7½ inches or 27½ inches.

Figure 4:
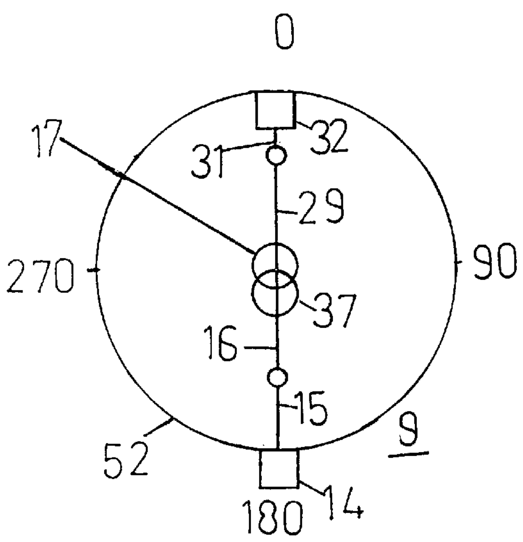

FIG. 4 shows subassembly 9 with weight 32 at 0 degrees and weight 14 at 180 degrees. The effective radius of rotation of weight 32 is 25 inches and the effective radius of rotation of weight 14 is 30 inches.

Figure 5:
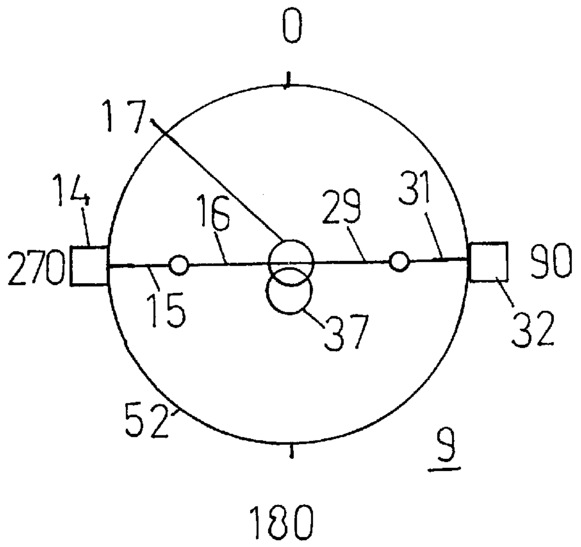

FIG. 5 shows subassembly 9 with weight 32 at 90 degrees and weight 14 at 270 degrees. The effective radius of rotation of both weight 32 and weight 14 is 27½ inches.

When the weights are at 0 and 180 degrees as in FIGS. 2 and 4 the difference in effective radii of weights 14 and 32 are at a maximum and the contribution to vibration is at a maximum. When the weights are at 90 and 270 degrees as in FIG. 3 and FIG. 5 the effective radii of the weights are equal and there is no contribution to vibration.

It should be noted that the displacement of collar 37 from collar 17 does not vary during the course of a rotation. The vibratory impulse occurs at the same points in each rotation of the subassembly. Because of this invariant relationship between vibratory impulse and rotation, the direction of the vibration is determined and controlled.

Figure 6:
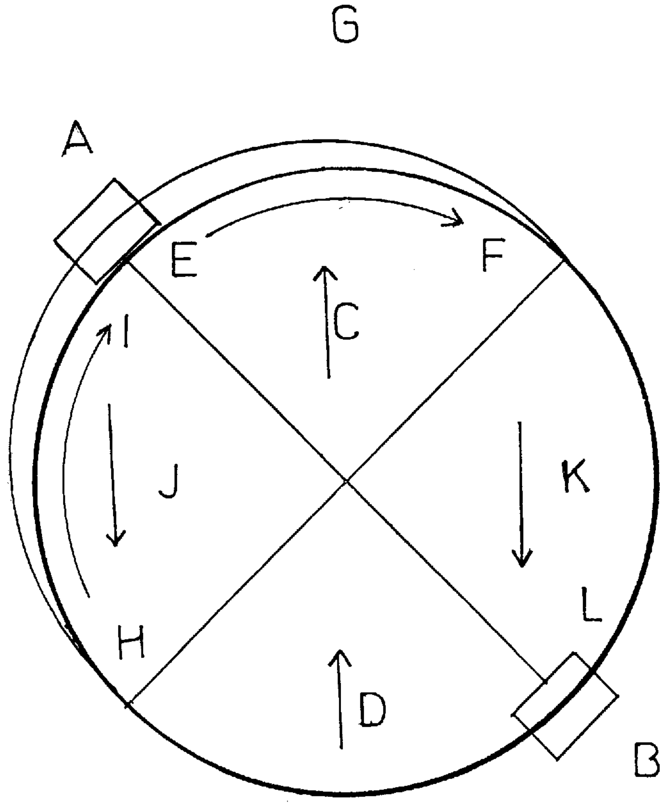
FIG. 6 is a diagram showing the directions of the forces generated by the rotation of the radius variation subassembly through a complete circle.

FIG. 6 is a diagram which shows the direction of the forces generated by the clockwise rotation of a radius variation subassembly. A and B represent weights at the arms of a subassembly. Clockwise rotation of weights A and B through ¼ turn, i.e. rotation of A from E to F and B from L to H, produces forces in the direction of arrows C and D for the duration of the ¼ turn. These forces give momentum in the direction represented by arrow G.

A further ¼ turn rotation, i.e. rotation of A from F to L and B from H to I, produces forces in the direction of arrows J and K.

These forces and momentum are repeated by further rotation of the subassembly.

The over all movement is first forward in direction as indicated by momentum G, followed by the generation of opposing forces which bring the whole device to a halt.

It will be apparent to those skilled in the art that the examples and embodiments described herein are by way of illustration and not of limitation, and that other examples may be used without departing from the spirit and scope of the present invention, as set forth in the appended claims.

I claim:

1. A vibrator comprising:

a base, an axle connected to said base, said axle having a bend, a rotating radius variation subassembly having an upper and a lower collar axially mounted on said axle, so said upper collar is on one side and said lower collar is on the other side of said bend, and arms extending from each collar, and connecting links connecting the arms from the upper collar and the arms from the lower collar, and weights attached at the connecting links, so that the displacement imparted to said upper collar during the rotation of said subassembly by the bent axle varies the effective radius of rotation of each weight as said subassembly rotates, thereby imparting vibration, and means to rotate said subassembly.

2. The vibrator of claim 1 wherein said radius variation subassembly comprises:

a freely rotatable upper collar, a freely rotatable lower collar two lower arms of equal length, each having a first and a second end, each attached radially by said first end to said lower collar at the same diameter to said lower collar, so said lower arms extend from said lower collar and rotate when said lower collar rotates, two upper arms of length equal to the length of said lower arms, each having a first and a second end, each attached radially by said first end to said upper collar at the same diameter to said upper collar, so said upper arms extend from said upper collar and rotate when said upper collar rotates, four connector arms of equal length, each having a first and a second end, each pivotally attached by a hinge at said first end to said second end of one of each of said upper and lower arms, so connector arms extend from and are connected to the second end of each said upper and lower arms, each lower connector arm attached by a weight hinge at said second end to the second end of a connector arm attached to an upper arm, and a weight attached to each weight hinge.

3. The vibrator of claim 1 wherein said means to rotate said subassembly comprises:

motor means to rotate said lower collar.

4. The vibrator of claim 3 wherein said motor means to rotate said second collar comprise:

a spacer rotatively axially mounted on said axle, said spacer mounted to the underside of said lower collar, a first gear rotatively axially mounted on said axle, said first gear mounted to said spacer, so that rotation of said first gear causes rotation of said spacer and said lower collar, a second gear which engages said first gear, said second gear mounted on a second axle, a pulley mounted on said second axle, said pulley connected by belt means to a motor for rotating said pulley, and a motor for rotating said pulley.

5. The vibrator of claim 1 further comprising means for fixing the location of said upper collar on said axle.

6. The vibrator of claim 5 wherein means for fixing the location of said upper collar on said axle is a ring secured by a setscrew.

7. A vibrator comprising:

a base, a support member, said support member fastened to said base, an axle having a first end and a second end and a bend between said end, said axle rigidly attached to said support member at said first end, a freely rotatable lower collar axially placed upon said axle, said collar placed upon said axle between said bend and said support member, a freely rotatable upper collar axially placed upon said axle, said upper collar placed upon said axle between said bend and said second end, two lower arms of equal length, each having a first and a second end, each attached radially by said first end to said lower collar at the same diameter to said lower collar, so said lower arms extend from said lower collar and rotate when said lower collar rotates, two upper arms of length equal to the length of said lower arms, each having a first and a second end, each attached radially by said first end to said upper collar at the same diameter to said upper collar, so said upper arms extend from said upper collar and rotate when said upper collar rotates, four connector arms of equal length, each having a first and a second end, each pivotally attached by a hinge at said first end to said second end of one of each of said upper and lower arms, so connector arms extend from and are connected to the second end of each said upper and lower arms, each connector arm attached to a lower arm attached by a weight hinge at said second end to the second end of a connector arm attached to an upper arm, a weight attached to each weight hinge, and means to rotate said lower collar, so that rotation of said lower collar causes rotation of lower arms, connector arms, weights, upper arms, and upper collar, and extension or retraction of said weights with respect to said first collar, thereby inducing vibration.

8. The vibrator of claim 7 wherein said means to rotate said first collar comprises:

a spacer rotatively axially mounted on said axle, said spacer mounted to the underside of said lower collar, a first gear rotatively axially mounted on said axle, said first gear mounted to said spacer, so that rotation of said first gear causes rotation of said spacer and said lower collar, a second gear which engages said first gear, said second gear mounted on a second axle, a pulley mounted on said second axle, said pulley connected by belt means to a motor for rotating said pulley, and a motor for rotating said pulley.

9. The vibrator of claim 7 further comprising means for fixing the location of said upper collar on said axle.

10. The vibrator of claim 9 wherein means for fixing the location of said upper collar on said axle is a ring secured by a setscrew.

* * * * *